(12) United States Patent
Athanasiou et al.

(10) Patent No.: US 12,466,932 B2
(45) Date of Patent: Nov. 11, 2025

(54) PROCESS FOR THE ENHANCEMENT OF THE BIODEGRADABILITY OF POLYOLEFINIC MATERIALS

(71) Applicant: FONDAZIONE ISTITUTO ITALIANO DI TECNOLOGIA, Genoa (IT)

(72) Inventors: Athanasia Athanasiou, Genoa (IT); Laura Bertolacci, Genoa (IT)

(73) Assignee: Fondazione Istituto Italiano Di Tecnologia, Genoa (IT)

( * ) Notice: Subject to any disclaimer, the term of this patent is extended or adjusted under 35 U.S.C. 154(b) by 539 days.

(21) Appl. No.: 18/004,382

(22) PCT Filed: Jul. 7, 2021

(86) PCT No.: PCT/EP2021/068773
§ 371 (c)(1),
(2) Date: Jan. 5, 2023

(87) PCT Pub. No.: WO2022/008570
PCT Pub. Date: Jan. 13, 2022

(65) Prior Publication Data
US 2023/0279193 A1    Sep. 7, 2023

(30) Foreign Application Priority Data
Jul. 10, 2020 (IT) .................. 102020000016798

(51) Int. Cl.
| | | |
|---|---|---|
| C08J 11/10 | (2006.01) | |
| B29B 17/04 | (2006.01) | |
| C08K 5/00 | (2006.01) | |
| C12N 9/08 | (2006.01) | |

(52) U.S. Cl.
CPC ........... C08J 11/105 (2013.01); C08K 5/0033 (2013.01); C12N 9/0065 (2013.01); C08J 2323/06 (2013.01); C12Y 111/02001 (2013.01)

(58) Field of Classification Search
CPC .. C08J 11/10; C12Y 111/02001; B29B 17/04; C12N 9/0065
See application file for complete search history.

(56) References Cited

U.S. PATENT DOCUMENTS

2017/0349723 A1   12/2017   Ferreira et al.

FOREIGN PATENT DOCUMENTS

| EP | 3162841 A1 | 5/2017 |
| JP | H1112379 A | 1/1999 |

OTHER PUBLICATIONS

International Search Report and Written Opinion for International Patent Application No. PCT/EP2021/068773, mailed Nov. 8, 2021, 12 pages.
Deepakk Gupta et al., The genome sequence of the commercially cultivated mushroom reveals a conserved repertoire of fruiting-related genes and a versatile suite of biopolymer-degrading enzymes, BMC Genomics, Jan. 15, 2018, pp. 1-13, vol. 19, No. 1, Biomed Central Ltd., London, GB.
Nupur Ojha et al., Evaluation of HDPE and LDPE degradation by fungus, implemented by statistical optimization, Scientific Reports, Jan. 4, 2017, pp. 1-13, vol. 7, article No. 39515, Springer Nature.
Sheik Sana et al., Biodegradation of gamma irradiated low density polyethylene and polypropylene by endophytic fungi, International Biodeterioration & Biodegradation, Nov. 1, 2015, pp. 21-29, vol. 105, Elsevier.
Alshehrei F., Biodegradation of Synthetic and Natural Plastic by Microorganisms, Journal of Applied & Environmental Microbiology, 2017, pp. 8-19, vol. 5, No. 1, Science and Education Publishing.
Restrepo-Flórez Juan-Manuel et al., Microbial degradation and deterioration of polyethylene—A review, International Biodeterioration & Biodegradation, Mar. 2014, pp. 83-90, vol. 88, Elsevier Ltd.
Yang Jun et al., Evidence of Polyethylene Biodegradation by Bacterial Strains from the Guts of Plastic-Eating Waxworms, Environmental Science & Technology, Nov. 10, 2014, pp. 13776-13784, vol. 48, Issue 23, ACS Publications.
Bombelli Paolo et al., Polyethylene bio-degradation by caterpillars of the wax moth *Galleria mellonella*, Current Biology, Apr. 24, 2017, R292-R293, vol. 27, Issue 8, Cell Press.
Xiaoting Jin et al., Conditions Optimizing and Application of Laccase-mediator System (LMS) for the Laccase-catalyzed Pesticide Degradation, Scientific Reports, Oct. 24, 2016, Article No. 35787, vol. 6, Nature.
D'Souza Trevor M. et al., Lignin-Modifying Enzymes of the White Rot Basidiomycete *Ganoderma lucidum*, Applied and Environmental Microbiology, Dec. 1999, pp. 5307-5313, vol. 65, No. 12, American Society for Microbiology (ASM).
Kyaw, B. M. et al., Biodegradation of Low Density Polythene (LDPE) by *Pseudomonas* Species, Indian J. Microbiol., Jul.-Sep. 2012, pp. 411-419, vol. 52, No. 3, Springer.
Liers Christiane et al., Patterns of lignin degradation and oxidative enzyme secretion by different wood- and litter-colonizing basidiomycetes and ascomycetes grown on beech-wood, FEMS Microbiology Ecology, Oct. 2011, pp. 91-102, vol. 78, Issue 1, © Federation of European Microbiological Societies, published by Blackwell Publishing Ltd.

*Primary Examiner* — Maryam Monshipouri
(74) *Attorney, Agent, or Firm* — Armstrong Teasdale LLP

(57) ABSTRACT

A process for enhancing biodegradability of polyolefinic materials is provided. The process includes providing a polyolefinic material, mixing the polyolefinic material with at least one fatty reagent, heating up the polyolefinic material mixed with the at least one fatty reagent to the melting temperature of the polyolefinic material to obtain a melted material, letting the melted material cool at room temperature for a time sufficient to obtain a solidified product, and incubating the solidified product with at least one fungal mycelium selected from fungal strains secreting Unspecific Peroxygenases (UPO), in presence of a fungal culture medium.

13 Claims, 4 Drawing Sheets

PROCESS FOR THE ENHANCEMENT OF THE BIODEGRADABILITY OF POLYOLEFINIC MATERIALS

CROSS-REFERENCE TO RELATED APPLICATIONS

This application is a National Stage Application of International Patent Application No. PCT/EP2021/068773, having an International Filing Date of Jul. 7, 2021, which claims priority to Italian Application No. 102020000016798, filed Jul. 10, 2020, the entire contents of each of which are hereby incorporated by reference herein.

BACKGROUND OF THE INVENTION

The present invention relates to a process for the enhancement of the biodegradability of polyolefinic materials.

STATE OF THE ART

Synthetic polymers have invaded our lives the last 50 years in a broad spectrum of applications, due to their advantageous features, such as lightweight, tunable physical properties, low cost, easy processability, etc. In particular, polyolefins (POs) constitute the most widely used polymeric materials and almost 60% of the total plastic content of municipal solid waste. POs recycling worldwide sets below 10%, the remaining waste material, mainly deriving from single-use packaging, being inappropriately discarded. As a drawback of the widespread disposal and of the biopersistence of plastic materials, they have been found to accumulate in the environment worldwide, provoking devastating effects on the wildlife. Therefore, the necessity to develop a strategy that avoids the accumulation of these polymeric wastes to the environment has become extremely urgent.

Strategies based on biotechnology could allow the achievement of enhance biodegradation and the obtainment of specific high value products, by exploiting the specificity and selectivity of enzymatic catalysis. Alshehrei F. [Alshehrei F. 2017. Journal of Applied & Environmental Microbiology, Vol. 5(1):8] discloses the potentiality to induce biodegradation of plastics by microbial enzymatic attack; however, the efficiency of these methods is still low and cannot yet constitute a reliable process for the massive reduction of plastic waste.

Restrepo-Flórez et al. [Restrepo-Flórez et al. Int. Biodeterior. Biodegrad. 2014, 88, 83-90] describes the resistance of polyolefins to microbial attack. Sheik et al [Sheik et al. International Biodeterioration & Biodegradation. 105 (2015):21] describe the formation of carbonyl groups on Low Density Polyethylene (LDPE) after its exposure to doses of gamma radiation from 200 to 1000 kGy, while lower doses were ineffective and evidences indicating fungal efficiency in plastic degradation for LDPE strips irradiated with the highest dose. The adsorbed doses employed in the experiments are very high compared to the doses commonly used in material industry, i.e. 10-30 kGy for the sterilization, 20-50 kGy to catalyze polymerization and grafting, 50-150 kGy to induce cross-linking. Due to the high level of energy required, this pretreatment can be difficultly adapted for the processing of huge quantitative of waste polymeric material at industrial level. Hence, the necessity to develop alternative sustainable pretreatment processes remains crucial. The value of a pretreatment process, aiming at increasing biodegradability of polyolefins, is strictly connected to the reliability of a forthcoming transfer to industry.

The second challenge faced while aiming at biodegrading PE is the identification of efficient biotechnological tools (enzymes/microorganisms). It is noteworthy that the enzymes described for the temptative degradation of the other commercially diffused plastics such as polyethylene therephtalate (PET) or nylon would be completely useless for polyolefin degradation. Indeed, while the former contains hydrolysable esteric or amidic bonds, polyolefin chains are constituted exclusively by carbon and hydrogen atoms. Compared to the former, C—C and C—H bonds are highly energetic and difficult to be cleaved. Indeed, because of the lack of activated carbons, they are not susceptible to hydrolysis through nucleophilic attack by the oxygen of water molecules.

Microorganisms to be employed for temptative PE biodegradation are usually "blindly" selected through a screening of unknown microbial communities and the evaluation of their degradatory potential. The polymer, in form of either film or powder, is incubated with soils collected in dumps, containing consortia of microorganisms. Microorganisms able to grow using PE as the sole carbon source are isolated and possibly further characterization of enzymes involved in the biodegradation is conducted. An example of this approach is represented by the works of Yang [Yang et al. Environ. Sci. Technol. 2014, 48, 13776] and Bertocchini [Bombelli et al. Current Biology 27, R283-R293, Apr. 24, 2017] which, independently, identified some worms eating polyolefinic materials. The major experimental evidence was that PE was shredded and swallowed by worms. Further, the authors presented labile evidences of potential biodegrading activity. In details, Yang isolated some bacterial strains from the worms' gut, but did not identify any putative involved enzyme. Bertocchini detected some activity after smearing worm homogenate on the surface of polyethylenic films. But no specific microorganism was isolated, and no enzyme was identified. Moreover, it was argued by Weber et al that Bertocchini experiments lacked the comparison with a negative control to demonstrate that the detected signal could be assigned to biodegraded PE rather than to biological material from worm homogenate. Concluding, the apparently impressive macroscopic consumption of the plastic material can be attributed to the worms chewing and swallowing, more than to a real biodegradation. And it must be considered that this shreddering activity originates microplastics that are much more harmful for the environment and wildlife than macroplastic wastes.

The only methodology described in literature that aims at rationally select the biotechnological tools for PE biodegradation is represented by the attempt to employ laccases, considering the ability of these enzymes to degrade lignin, the most persistent natural biopolymer. These enzymes are secreted by white-rot fungi and are able to catalyze the oxidation of (poly)phenolic substrates, like lignin. Despite the low oxidation reduction potential of laccase (0.5 to 0.8 V), that would limit the activity of these enzymes to the sole phenolic species, this class of enzymes was successfully employed for the degradation of non phenolic aromatic persistent pullutants such as dyes, pesticides, polycyclic aromatic hydrocarbons, hormone-like chemicals [Xiaoting Jin et al. 2016. Conditions Optimizing and Application of Laccase-Mediator System (LMS) for the Laccase catalyzed Pesticide Degradation. Scientific reports. 6:35787]. This application was allowed by the so-called Laccase mediator system (LMS), that requires the addiction of redox mediators. Limits connected with this LMS are the high costs of the mediators combined to the need of high mediator/substrate ratios (going from 5:1 up 100:1 or bigger). Moreover, the oxidation of polyethylene with a system like LMS, developed for the oxidation of aromatic substrates, is expected to have very low efficiency considering that the saturated polyolefinic chains are dramatically less oxidizable than aromatic compounds. Indeed, the potentiality of the LMS to oxidize not only aromatic, but also aliphatic compounds, disclosed by Mayer and Staples [Laccase: new functions for an old enzyme. Phytochemistry 60 (2002) 551-565], is expressly restricted only to polyunsaturated and aromatic allyl alcohols, characterized by dense insaturation and electronic delocalization, leading to high reactivity due to the stabilization of the radicalic reaction intermediates. For this reason, laccases (and laccases secreting microorganisms) do not represent a promising candidate for polyolefinic materials biodegradation.

The possibility of having a process, for the enhancement of the biodegradability of polyolefinic materials, which requires little energy, low costs of reagents, environmental sustainability, which is efficient, suitable for processing huge quantitative of polyolefinic materials, which uses efficient biotechnological tools capable of degrading polyolefinic materials, is therefore a need felt in the market.

SUMMARY OF THE INVENTION

The object of the present invention is therefore to provide a process for the enhancement of the biodegradability of polyolefinic materials, which requires little energy, low costs of reagents, environmental sustainability, which is efficient, suitable for processing huge quantitative of polyolefinic materials, which uses efficient biotechnological tools capable of degrading polyolefinic materials.

This objective is achieved by a process as outlined in the appended claims, the definitions of which form an integral part of the present patent application.

In particular, a first object of the present invention relates to a process for the enhancement of the biodegradability of polyolefinic materials comprising the steps of:
  a. providing a polyolefinic material;
  b. mixing the polyolefinic material with at least a fatty reagent, with a ratio of fatty reagent/polyolefinic material ranging from 1/5 to 1/1 in weight;
  c. heating up the polyolefinic material mixed with the at least a fatty reagent to the melting temperature of the polyolefinic material, in order to obtain a melted material;
  d. letting cool the melted material at room temperature for a time sufficient to obtain a solidified product;
  e. incubating the solidified product with at least a fungal mycelium selected from fungal strains secreting unspecific peroxygenases (UPO) (EC 1.11.2.1), in presence of at least a fungal culture medium.

According to a preferred embodiment of the process of the present invention, the polyolefinic material is preferably selected form: low-density polyethylene (LDPE), polypropylene (PP), high-density polyethylene (HDPE). More preferably, the polyolefinic material is low-density polyethylene (LDPE).

According to a preferred embodiment of the process of the present invention, the at least a fatty reagent is preferably selected from: fatty acid (FA), vegetable oil. More preferably is selected from: oleic acid (OA), olive oil (OO).

According to a preferred embodiment of the process of the present invention, the at least a fungal mycelium is preferably *Agrocybe aegerita* mycelium.

According to a preferred embodiment of the process of the present invention, the fungal culture medium comprises preferably sodium, potassium, magnesium, iron (II) cations, nitrate, hydrogenphosphate, sulfate, chloride anions and further the fungal culture medium is preferably free from any carbon sources. The term "carbon sources" refers to those substances from which it is possible to obtain carbon by metabolic reactions. A non-limiting example of carbon sources are carbohydrates.

As known by the skilled person in the art, carbon sources can either have a structural function (forming the constituents of the biomass) or be employed as a source of energy. While autotrophic organisms like plants or cyanobacteria can exploit atmospheric or dissolved $CO_2$ as inorganic carbon sources, mycelia and the other heterotrophic organisms rely on organic compounds.

More preferably, the fungal culture medium is a modified Czapek-Dox Broth comprising sodium nitrate, potassium hydrogenphosphate, magnesium sulfate, potassium chloride, iron (II) chloride. As well known by the skilled person in the art, the Czapek-Dox Broth is a commercially known media for growth of fungi but the Czapek-Dox Broth according to the present invention is modified by mixing only the inorganic salts (sodium nitrate, potassium hydrogenphosphate, magnesium sulfate, potassium chloride, iron(II) chloride) without any carbon source, in order to force the mycelium to consume the polymer as sole available carbon source.

According to a preferred embodiment of the process of the present invention, preferably, between the step c and the step d, the process also comprises the following step:
  once the melting temperature of the polyolefinic material is reached, maintaining that temperature for a time comprised between 4 minutes and 6 minutes; more preferably for 5 minutes.

According to a preferred embodiment of the process of the present invention, preferably, in the step d of the process, the melted material is left to cool at room temperature for a time comprised between 4 minutes and 6 minutes. More preferably for 5 minutes.

According to a preferred embodiment of the process of the present invention, preferably, in the step e of the process, the incubation takes place at a temperature comprised between 23° C. and 29° C., a relative humidity (RH) comprised between 60% and 90%, for a time comprised between 1 month and 5 months. More preferably, the temperature is 26° C., the RH is comprised between 70% and 80% and the time is 3 months.

According to an alternative embodiment of the process of the present invention, the steps c and d of the process are preferably repeated in sequence from 1 to 5 times.

The present invention aims to the development of an efficient process to address the environmental issue of plastic pollution, exploiting chemistry and biotechnology to enhance the potentiality of polyolefins biodegradation. In particular, the claimed process focuses on a two-fold strategy consisting of the design of a pretreatment step, with a fatty reagent, to help material colonization by fungal mycelium and the selection of the appropriate fungal strains that can efficiently oxidize the polyolefinic material.

The fungal strain for the biodegradation of mixed LDPE was searched among those expressing enzymes able to oxidize and cleave inactivated C(sp3)-H bonds of saturated hydrocarbons, mainly monooxigenases and peroxygenases.

Among potential enzymes and fungal strains, the preferred one according to the present invention is the fungus *Agrocybe Aegerita* (Aae) [Gupta et al. BMC Genomics (2018) 19:48; Liers et al. FEMS Microbiol Ecol (2011) 78:91].

This choice results from the combination of three different aspects:

Aae expresses a peroxigenase (AaeUPO), capable to oxidize alkanes;

some bacteria are known to express cytosolic or membrane bound oxidizing enzymes (CYT450 or AlkB families), the characteristic of being cytosolic or membrane bound enzymes means that they can exert their biocatalytic activity only inside the microbial cells; on the contrary, fungal degrading enzymes are secreted, which eliminates the need for internalization of the substrate. This characteristic is determinant for polyolefins' biodegradation, since it allows attacking long chains, beyond the length limit of ~500 Da (corresponding to C long PE) that is the maximum weight able to cross the cell membrane;

*Agrocybe* cells, like those of most fungi, grow as elongated, filamentous structures, the hyphae, originating a dense net, called mycelium; this can exert also a mechanical action by "digging" into the polyolefinic material, similarly to what vegetal roots do.

These characteristics allow a synergistic bio-degradative action by combining the mechanical pressure of fungal mycelium with the biocatalytic potency of the secreted oxidizing enzymes.

More specifically, the steps a to d of process of the present invention targets the dense and energetic chain packing of the polyolefinic material, which limits the enzymatic attack because of the very low mobility and accessibility of target moieties. For the biocatalytic enzymatic action to take place, indeed, the substrate's polyolefinic chains must enter the catalytic pocket and fold properly in order to fit in it, and subsequently form the activated complex with the enzyme. This process results in energy demand that increases as the conformational freedom of the substrate's chains decreases. A purpose-built treatment of the polyolefins, aiming at loosening the tight packing of the polyolefinic chains prior to the enzymatic attack, can be the key to boost the subsequent enzymatic cleavage. The process of the present invention successfully addressed this challenge by mixing the polyolefinic material with fatty reagents (FAs or vegetable oils), at a temperature slightly above the melting temperature (Tm) of the polyolefin. Fatty reagents have a hydrocarbon tail, the conformation and rigidity of which depends on its length and on the presence and position of insaturations. This tail can intercalate the bulk of the polyolefin and interfere with the chain packing. Moreover, due to their polar head (carboxylic or esteric moiety), their integration within the polyolefinic matrix was able to destabilize the interactions among the chains, resulting in swelling and softening of the polyolefinic material.

The process of the present invention has the advantage of requiring a little amount of energy, necessary just to heat the polyolefinic material above its Tm, while the fatty reagents could be derived from waste of the food and oleochemical industry.

According to a preferred embodiment of the process of the present invention, the preferred fungal mycelium is a white-rot basidiomycete fungal mycelium: *Agrocybe aegerita* (Aae). Aae expresses and secretes a peroxigenase (AaeUPO), which is able to oxidize alkanes and, as demonstrated by the examples given below, it has now been advantageously demonstrated to be also capable of degrading polyolefins.

Moreover, the process of the present invention advantageously employs mycelium net instead of unicellular fungal suspensions in order to exploit the mechanical action of the hyphae.

Each of the abovementioned technical features leads to specific advantages:

the steps with fatty reagent aim at loosening polyolefinic chain packing, facilitating mycelial colonization and enzymatic action;

the incubation with fungal mycelium allows deep penetration into the solidified product and outstanding ability in oxidizing polyolefinic chains.

The following examples of embodiments are provided for the sole purpose of illustrating the present invention and should not be understood as limiting the scope of protection defined by the appended claims.

EXAMPLES

Example 1

LDPE pellets were grinded into 3 mm size particles with a dry mill. 500 mg of grinded LDPE was mixed with a fatty reagent (either pure oleic acid or vegetable oil), the ratio fatty reagent/LDPE was 1/1 in the final material. Afterwards, the specimens were heated up to the melting temperature of LDPE (about 120° C.) for 5 minutes, using a hot plate, and let cool and solidify at room temperature for 5 minutes, repeating 5 cycles of melting/solidification. Melting was easily detected because the polyolefinic material became transparent and undistinguishable from the liquid fat. During the melting/solidification cycles, the liquid fat was incorporated into the solid material, and the two phases became indistinguishable in the resulting material, which was finally solidified in sheets (thickness 1.0 mm). Control samples of pristine LDPE underwent the same temperature cycles. Sheets, kept in sterile environment after the thermal treatment to avoid contamination, were cut into squares having sides of 1 cm and placed on 5 cm diameter Petri dish.

Subsequently, 8 mm diameter disks were punched from mycelial mats of *Agrocybe aegerita* grown on Potato Dextrose Broth (PDB) (as well known by the skilled person in the art, PDB is a commercially known media for growth of fungi) and were put on the surface or in the vicinity of the polyolefinic samples. Incubation of the mycelium in presence of the polyolefinic material was conducted in either PDB or a modified Czapeck-Dox Broth, prepared by mixing only the inorganic salts (sodium nitrate, potassium hydrogenphosphate, magnesium sulfate, potassium chloride, iron (II) chloride) without any carbon source. Growth conditions of 26° C. and 70-80% RH were maintained within a plant growth chamber (Memmert). Mycelia were let grow for three months.

In parallel, *Ganoderma lucidum* (Gl), another white-rot basidiomycete was chosen as reference strain, which secretes lignin-modifying enzymes such as laccase, manganese-dependent peroxidase, and lignin peroxidase [D'souza et al. Appl. Environ. Microbiol. (1999) 65(12) 5307-5313]. The comparison between the action of Aae and Gl aimed at confirming that the capability of *Agrocybe aegerita* to oxidize LDPE chains is higher compared to that of other lignin degrading mycelia, as Gl.

Figure 1:
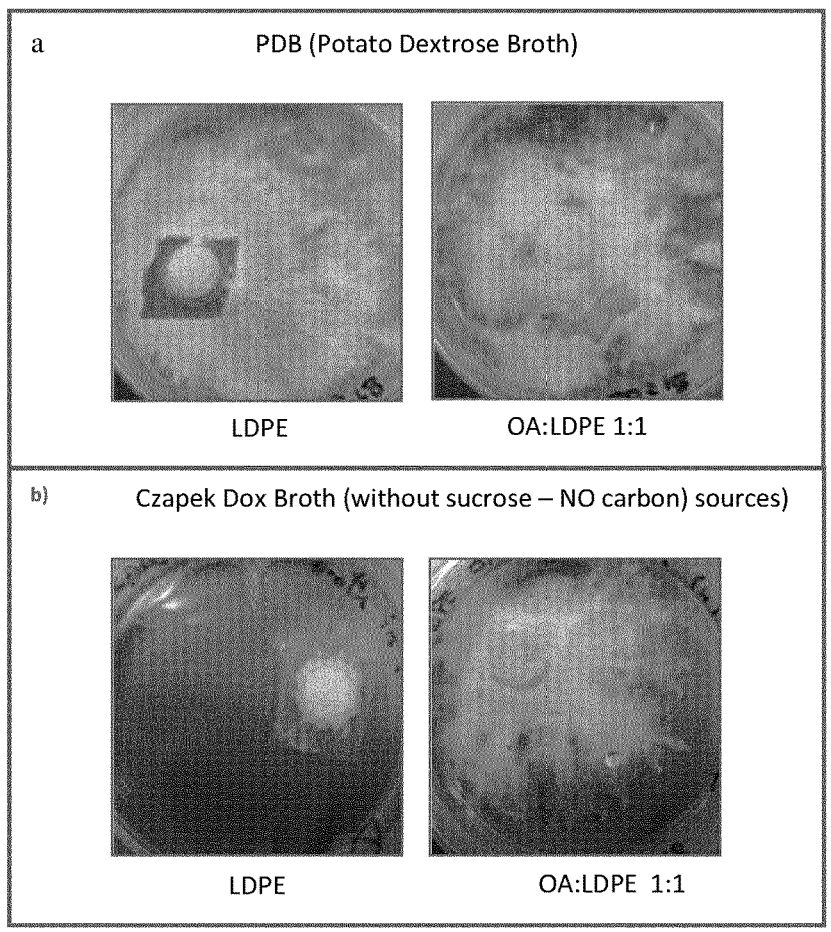
FIG. 1 shows: a) *Ganoderma lucidum* (Gl) mycelium growth conducted in presence of Potato Dextrose Broth (PDB). Mycelia did not grow on the sheet of pristine LDPE despite covering the available space in the Petri dish and consuming PDB (left), whereas they colonized the OA:LDPE mixed 1:1 and the space around it (right). b) Gl mycelium growth conducted in presence of a culture medium that does not contain any carbon source (modified Czapek Dox Broth, without sucrose). The mycelium could use exclusively the mixed material as carbon source: mycelia did not grow neither on the sheet of pristine LDPE nor in the Petri dish (left), whereas they colonized the OA:LDPE mixed 1:1 and the space around it (right).
Figure 2:
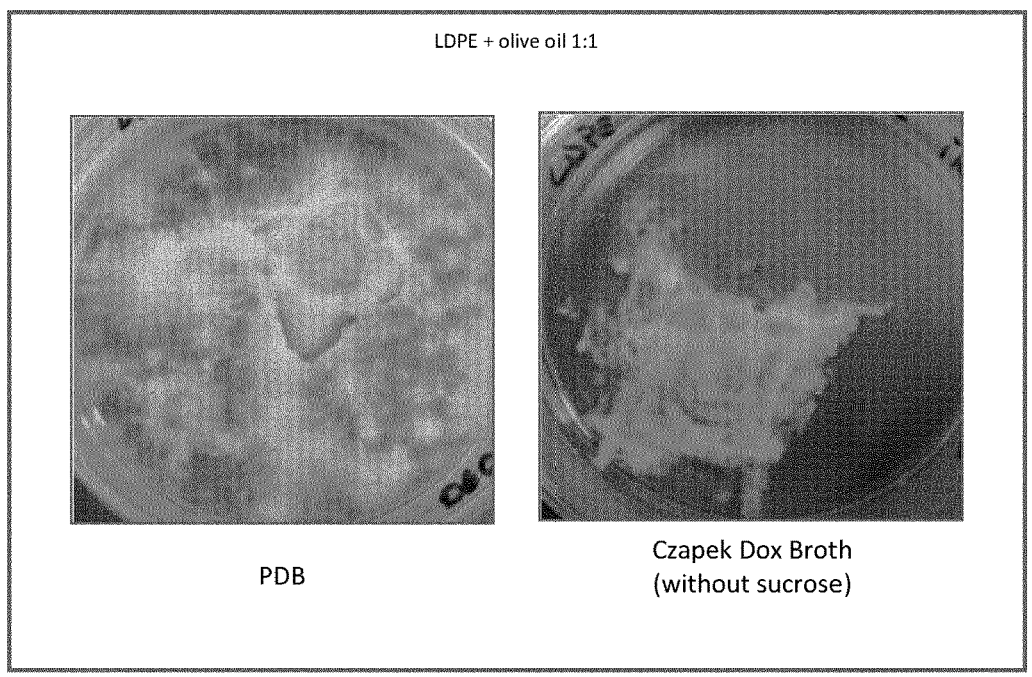
FIG. 2 shows Gl mycelium grown on LDPE mixed with olive oil (ratio 1:1). a) Growth conducted in presence of PDB; mixed LDPE was colonized by the mycelium. b) Growth conducted a culture medium that does not contain any carbon source (modified Czapek Dox Broth, without sucrose); mycelium was able to use LDPE mixed with OO 1:1 as sole carbon source.

Biodegradation of LDPE was assessed by monitoring the biofilm formation and the changes in surface morphology of the polyolefinic substrates using Scanning Electron Microscopy (SEM). Tested mycelia grew only on pretreated (with FA) LDPE, confirming the determinant effect of the mixing with fatty acids to overcome the well-known microbiological inertness of the polyolefins. FIGS. 1 and 2 demonstrates characteristic pictures of the Gl mycelia grown on LPDE and OA-mixed LPDE. In detail, mycelia did not grow on the control (pristine LDPE), while they grew intensively on the polyolefinic materials modified with the fat reagents, both in presence (FIG. 1a) and in absence (FIG. 1b) of alternative carbon sources (PDB). The fact that mycelia do not grow on pristine LDPE, despite the availability of all the nutrients that allow their growth on the free space of the Petri dish (FIG. 1a), confirms that the modifications induced by the treatment on LDPE with fatty reagent are determinant to render it feasible for fungal mycelial colonization. In addition, the results shown in FIG. 1b, demonstrate that mycelia are able to grow on mixed (with FA) LDPE as sole carbon source.

FIG. 2 shows Gl mycelia grown on LPDE and olive oil-mixed LPDE. The behavior is consistent with what observed mixing LDPE with OA instead of olive oil. The Aae mycelium showed identical behavior to the one demonstrated in FIGS. 1-2 for Gl mycelium.

Figure 3:
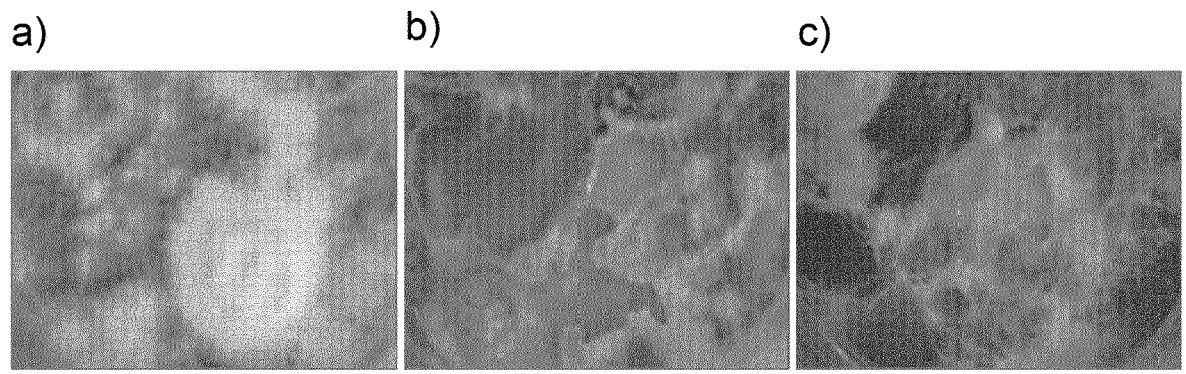
FIG. 3 shows Gl mycelium grown in PDB (a), in PDB supplemented with 20% of either oleic acid (b) or olive oil (c). Fatty acids and oils inhibit mycelium growth.

In this context, it is noteworthy that the ability of fatty reagents to promote LDPE colonization, when intercalated in the material, is in contrast with the well-known antimicrobial action of these molecules (see FIG. 3). In fact, FIG. 3 shows Gl mycelium growing in PDB (a) or in PDB supplemented with 20% of either oleic acid (b) or olive oil (c). As expected, fatty acids and oils inhibit mycelium growth.

Figure 4:
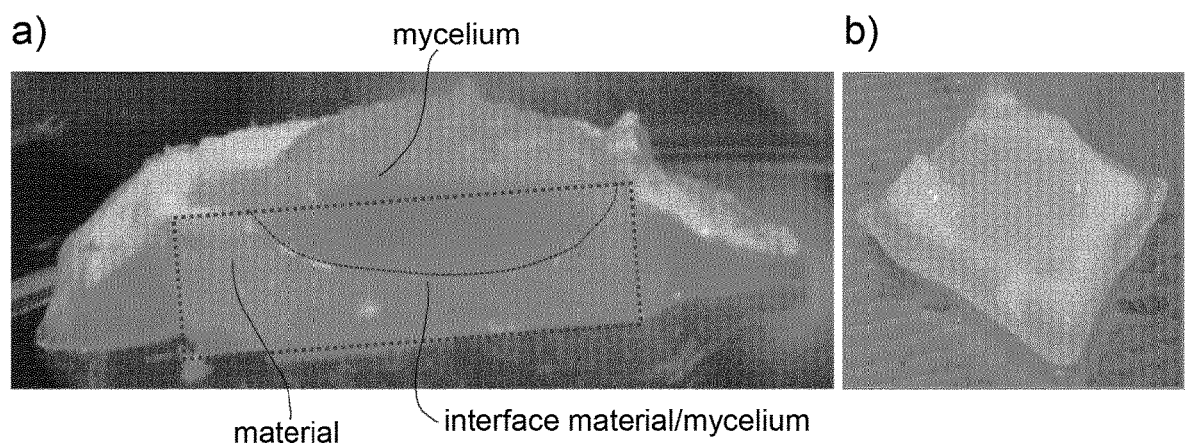
FIG. 4 shows the mycelium grown on the mixed polyolefinic material. a) Cross section of the material and the mycelium after the incubation. The mycelium grew in depth and consumed part of the treated material; (rectangular dotted line—the section of the material before the incubation; curved dotted line—the profile of the interface between the material and the mycelium, after the growth of the latter). b) Trace left on the material after the removal of the mycelium.

Mycelial colonization was not limited to the surface of the treated LDPE, since the hyphae penetrated into the material modifying its morphology macroscopically. FIG. 4a shows a picture of a cross section of a sample of OA-mixed LDPE (ratio 1:1) after the incubation with Gl. Before incubation, the sample had a rectangular section (rectangular dotted line) while the mycelium progressively thrusted inside the material, consuming it. The curved line highlights the interface between the mycelium and the material after the incubation. FIG. 4b shows another sample that underwent the same process (pretreatment with FA and incubation) but, afterwards, the mycelium was detached. It can be clearly seen that part of the OA-mixed LDPE material that was in direct contact with the mycelium is missing due to its consumption by the mycelium.

Figure 5:
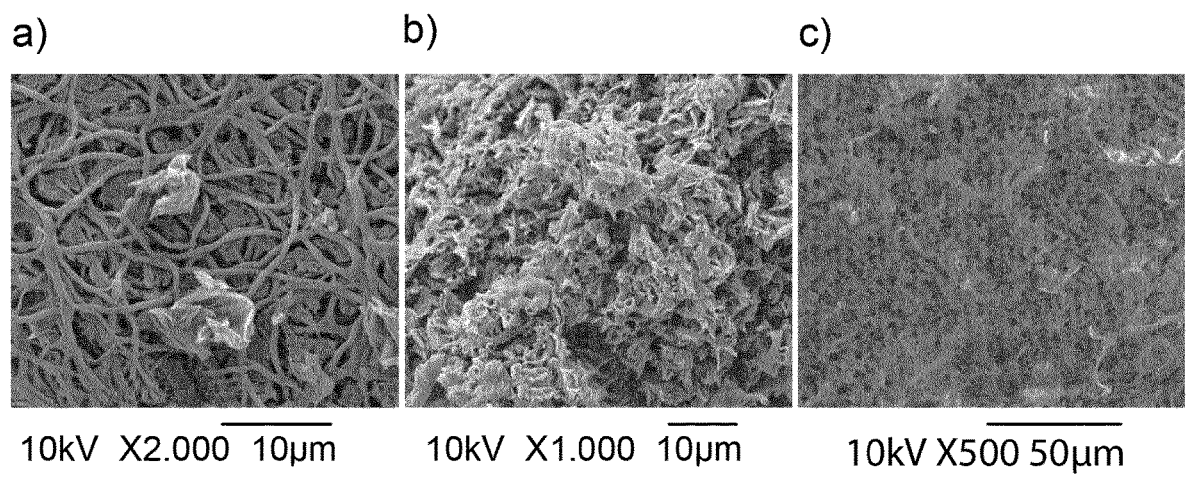
FIG. 5 shows SEM images of samples obtained by incubating fungal mycelium on LDPE mixed with oleic acid. Specimens were collected after the separation of the biological component from the polyolefinic material in order to highlight the deep interaction between mycelium and treated material. a) 2000× magnification of the surface of Gl mycelium, grown in direct contact with the polyolefinic material. Fragments of the polyolefinic material trapped within the hyphal net are clearly visible. b) and c) show 1000× and 500× magnification of the polyolefinic material after the incubation with, respectively, Gl and Aae mycelium and the removal of the biological material. Several mycelial hyphae penetrate in the material (tubular structures with circular section).

SEM magnification (see FIG. 5) allowed observing intimate integration between the fungal mycelium and the polyolefinic material, with hyphae penetrating in depth inside the material. Specimens were collected after the separation of the biological component from the polyolefinic substrate in order to investigate morphologically the interface between mycelium and polyolefinic material. FIG. 5a shows a piece of Gl mycelium mat grown on treated LDPE (OA:LDPE 1:1), after its removal; polyolefinic fragments trapped inside Gl hyphal network can be observed. The intimate interaction between mycelium and polyolefinic substrate is further highlighted in FIGS. 5b and 5c, where hyphae penetrating the surface of the polyolefinic material are clearly visible in specimens of substrate inspected after the incubation of either Gl (b) or Aae (c), even though the main volume of the mycelium mat is already removed.

Example 2

Furthermore, chemical analysis performed through Fourier-Transform Infrared (FTIR) spectroscopy highlighted an outstanding capability of *Agrocybe aegerita* to oxidize LDPE chains.

Figure 6:
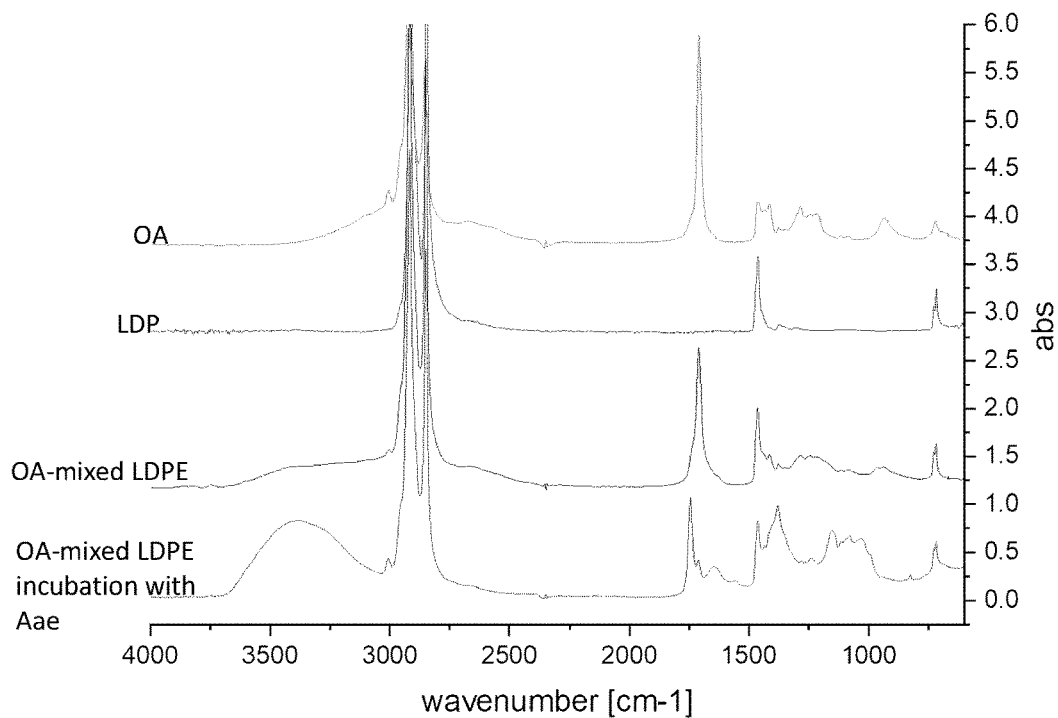
FIG. 6 shows a comparison of the ATR-FTIR spectra of oleic acid (OA), pristine LDPE (LDPE), OA-mixed LDPE (OA-mixed LDPE) and OA-mixed LDPE after the incubation with Aae (OA-mixed LDPE incubation with Aae).
Figure 7:
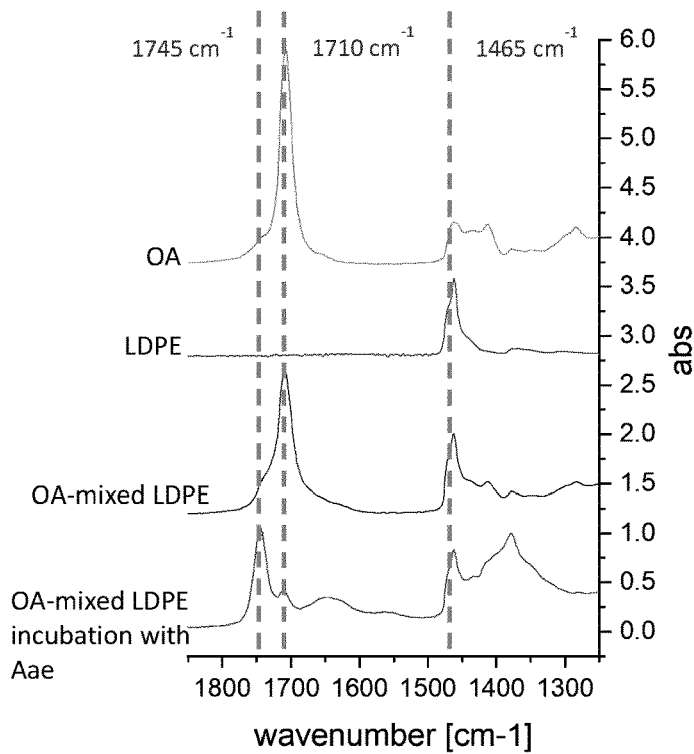
FIG. 7 shows a zoom on the carbonyl region (1600-1800 $cm^{-1}$) of FIG. 6; CH peak at 1465 is indicated as reference.

FIG. 6 compares the spectra of oleic acid, pristine LDPE, OA-mixed LDPE (1:1) and OA-mixed LDPE after the incubation with Aae. FIG. 7 is a zoom of the carbonyl region of the spectra in FIG. 6.

The spectrum of LDPE is characterized by four peaks: 2915, 2845, 1465 and 720 cm$^{-1}$. The spectrum of OA-mixed LDPE presents the characteristic peaks of LDPE, moreover three main differences can be identified:
- a broad peak spreading between 2250 cm$^{-1}$ and 3550 cm$^{-1}$, due to the OH of the free carboxylic moiety of OA;
- the "finger-prints" of oleic acid in the region below 1500 cm$^{-1}$;
- the sharp intense peak at 1710 cm$^{-1}$ due to the carbonyl of the carboxylic moiety of OA.

By comparing the spectrum of OA-mixed LDPE with those of pure OA and pristine LDPE, all the additional signals listed above are clearly derived from the presence of OA. In the spectrum of LDPE, as expected, no peak is detected in the carbonyl region (1600-1800 cm$^1$). On the other hand, it results uncontroversial that the new peak appearing at 1710 cm$^{-1}$ in the spectrum of the OA-mixed LDPE corresponds to the same peak present in the spectrum of OA. For this reason it is undoubtedly assigned to the carbonyl derived from the OA present in the OA-mixed LDPE. It is worth highlighting that no additional peak indicating LDPE oxidation is detected. Indeed, the thermal treatment is a quick melting just aiming at mixing LDPE with oleic acid and it does not provoke any chemical modification of the polyolefin.

Figure 8:
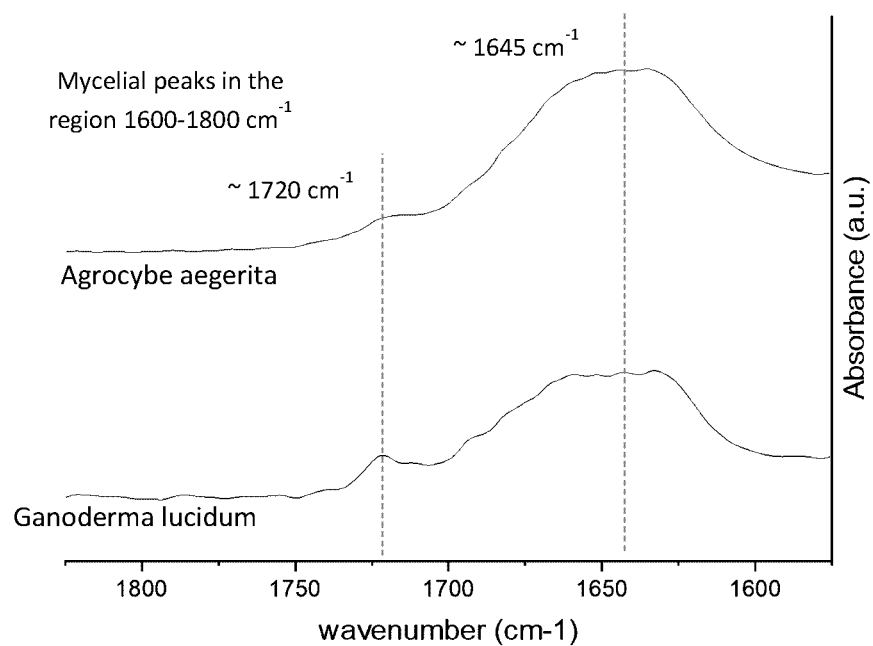
FIG. 8 shows a ATR-FTIR spectra of *Agrocybe aegerita* and *Ganoderma lucidum* mycelium, zoom on the carbonyl region 1600-1800 cm$^{-1}$. The spectra present a broad peak with two maxima at about 1645 cm$^{-1}$ and 1720 cm$^{-1}$. No signal is present at 1750 cm$^{-1}$.

Finally, the spectrum of OA-mixed LDPE, after its incubation with Aae, clearly indicates the effects of the mycelial biotic action. In details, the peak at 1710 cm$^{-1}$ has much lower intensity, suggesting that, as expected, the mycelium consumed oleic acid. On the other hand, a new peak is detected in the carbonyl region, at 1745 cm$^{-1}$. It is noteworthy that, from the comparison with the spectra of mycelia alone (see FIG. 8), it can be excluded that it derives from the fungal material. This peak was therefore assigned to carbonyls formed as consequence of the oxidation of LDPE.

Since this peak is present only in samples incubated with Aae (and, with much lower intensity, in those incubated with Gl), while it is absent in OA-mixed LDPE, it demonstrates that oxidation did not occur during the mixing process, but was caused by the biotic action of Aae.

The little oxidation detected in samples of OA-mixed LDPE incubated with Gl is lower compared with the oxidation caused by Aae.

A direct comparison of these results with those disclosed in literature was performed through the calculation of the carbonyl index (CI=$A_{C=O}/A_{1460}$). Indeed, this ratio allows a semiquantitative estimation of the level of oxidation, by normalizing the absorbance of the carbonyl peak over the value of the reference peak of LDPE (C—H bending at 1460 cm$^{-1}$), as described in literature [Kyaw, B. M et al., Biodegradation of Low Density Polythene (LDPE) by *Pseudomonas* Species. Indian J Microbiol 2012, 52 (3), 411-419]. The results obtained demonstrate an oxidative biodegradation potential of *Agrocybe aegerita* mycelium fourfold higher than the best so far reported results in the literature using microorganisms.

BIBLIOGRAPHY

Alshehrei F. 2017. Journal of Applied & Environmental Microbiology, Vol. 5(1):8.
Restrepo-Flórez et al. Int. Biodeterior. Biodegrad. 2014, 88, 83-90.
Sheik et al. International Biodeterioration & Biodegradation. 105 (2015):21.
Yang et al. Environ. Sci. Technol. 2014, 48, 13776.
Bombelli et al. Current Biology 27, R283-R293, Apr. 24, 2017.
Xiaoting Jin et al. 2016. Conditions Optimizing and Application of Laccase-Mediator System (LMS) for the Laccase catalyzed Pesticide Degradation. Scientific reports. 6:35787.
Laccase: new functions for an old enzyme. Phytochemistry 60 (2002) 551-565.
Gupta et al. BMC Genomics (2018) 19:48; Liers et al. FEMS Microbiol Ecol (2011) 78:91.
D'souza et al. Appl. Environ. Microbiol. (1999) 65(12) 5307-5313.
Kyaw, B. M et al., Biodegradation of Low Density Polythene (LDPE) by *Pseudomonas* Species. Indian J Microbiol 2012, 52 (3), 411-419.

What is claimed is:

1. A process for enhancing biodegradability of polyolefinic materials, the process comprising the steps of:
   (a) providing a polyolefinic material;
   (b) mixing the polyolefinic material with at least one fatty reagent, with a ratio of fatty reagent/polyolefinic material ranging from 1/5 to 1/1 by weight;
   (c) heating up the polyolefinic material mixed with the at least one fatty reagent to the melting temperature of the polyolefinic material to obtain a melted material;
   (d) letting the melted material cool at room temperature for a time sufficient to obtain a solidified product; and
   (e) incubating the solidified product with at least one fungal mycelium selected from fungal strains secreting Unspecific Peroxygenases (UPO), in presence of at least a fungal culture medium.

2. The process of claim 1, wherein the polyolefinic material is selected from: low-density polyethylene (LDPE), polypropylene (PP), high-density polyethylene (HDPE).

3. The process of claim 2, wherein the polyolefinic material is low-density polyethylene (LDPE).

4. The process of claim 1, wherein the at least one fatty reagent is selected from: fatty acid (FA), vegetable oil.

5. The process of claim 4, wherein the at least one fatty reagent is selected from: oleic acid (OA), olive oil (OO).

6. The process of claim 1, wherein the at least one fungal mycelium is *Agrocybe aegerita* mycelium.

7. The process of claim 1, wherein the fungal culture medium comprises sodium, potassium, magnesium, iron (II) cations, nitrate, hydrogenphosphate, sulfate, chloride anions, and wherein the fungal culture medium is free from any carbon sources.

8. The process of claim 7, wherein the fungal culture medium is modified Czapek-Dox Broth comprising sodium nitrate, potassium hydrogenphosphate, magnesium sulfate, potassium chloride, iron (II) chloride.

9. The process of claim 1, wherein between steps (c) and (d), the process further comprises the following step:
   once the melting temperature of the polyolefinic material is reached, maintaining the melting temperature of the polyolefinic material for a time comprised between 4 minutes and 6 minutes.

10. The process of claim 1, wherein, in step (d), the melted material is let to cool at room temperature for a time comprised between 4 minutes and 6 minutes.

11. The process of claim 1, wherein, in step (e), the incubation takes place at a temperature comprised between 23° C. and 29° C., a relative humidity (RH) comprised between 60% and 90%, for a time comprised between 1 month and 5 months.

12. The process of claim 11, wherein the temperature is 26° C., the RH is comprised between 70% and 80% and the time is 3 months.

13. The process of claim 1, wherein steps (c) and (d) are repeated in sequence from 1 to 5 times.

* * * * *